Oct. 9, 1962 J. C. CLATTERBUCK 3,057,599
TREE REMOVING ATTACHMENT FOR TRACTORS
Filed June 25, 1959 2 Sheets-Sheet 2
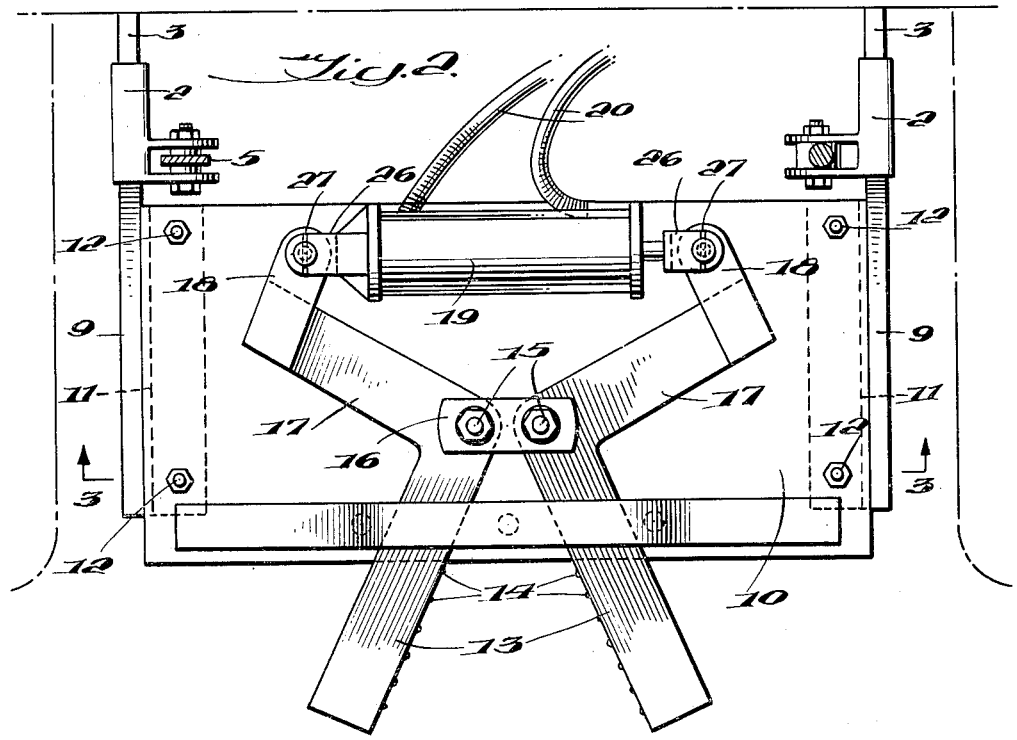
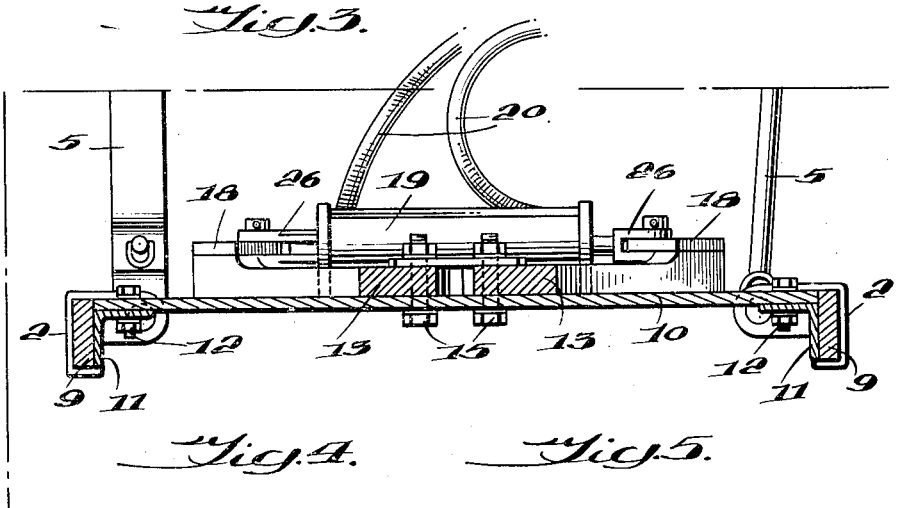
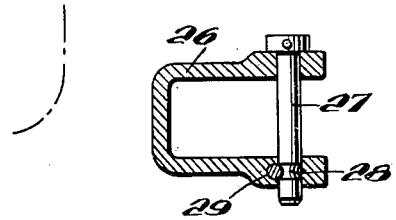
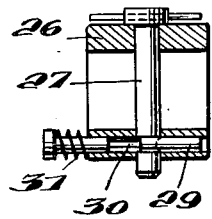
INVENTOR
JOHN C. CLATTERBUCK,
ATTORNEYS United States Patent Office 3,057,599
Patented Oct. 9, 1962

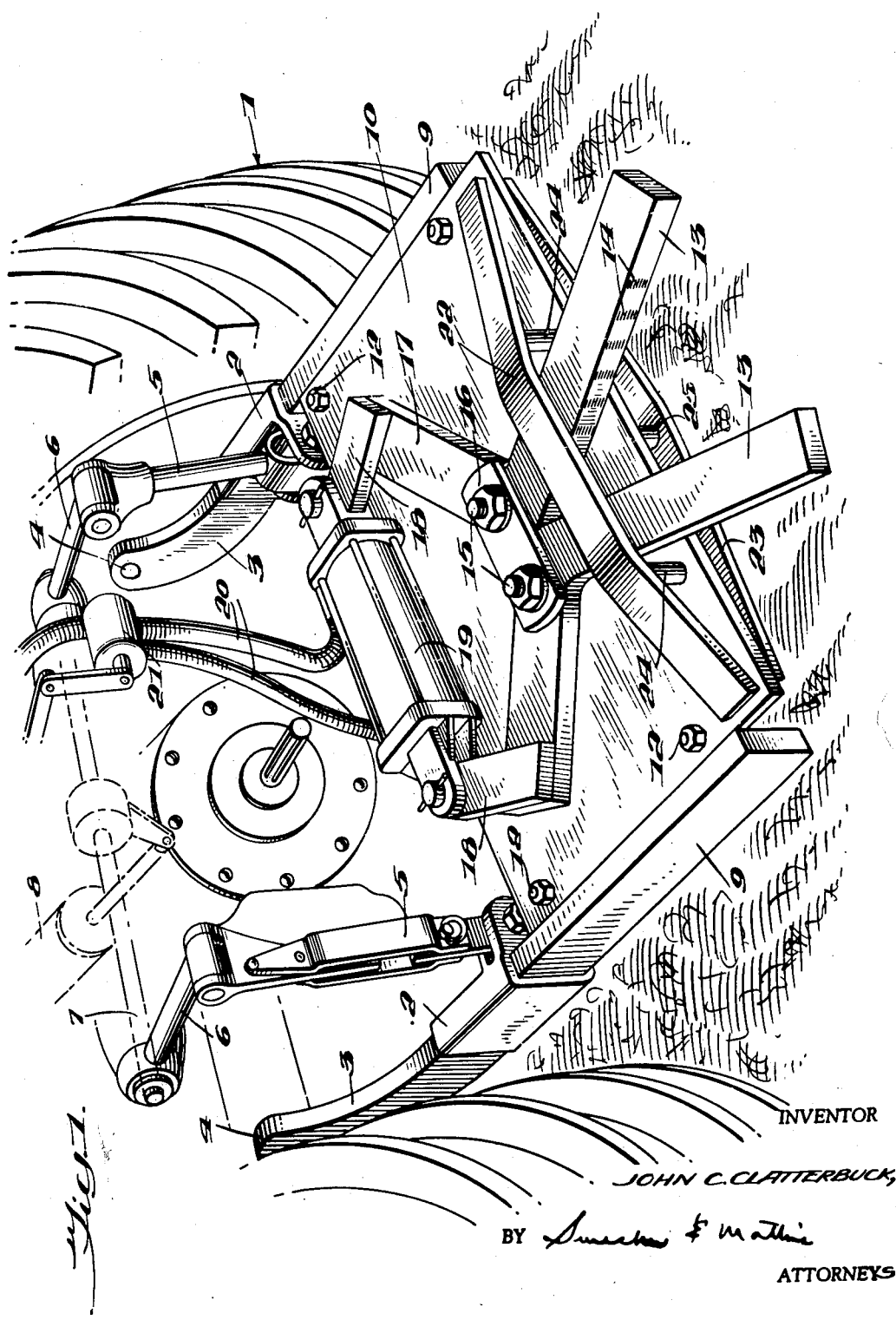

3,057,599
TREE REMOVING ATTACHMENT FOR TRACTORS
John C. Clatterbuck, R.F.D. 1, Purcellville, Va.
Filed June 25, 1959, Ser. No. 822,934
3 Claims. (Cl. 254—132)

This invention relates to improvements in tree removing attachments for tractors, and more particularly to attachments for farm or row type tractors, for the purpose of removing trees, brush, posts, and the like from the ground.

Various attempts have been made heretofore to provide devices which will pull up and remove small trees, brush, posts and the like, either as unitary structures or in the form of attachments to be applied to various types of tractors and bulldozers. Such devices have been unsatisfactory, either because of their ineffectiveness for the purpose or, due to the construction and manner of operation thereof, they were too expensive to be used as accessories or attachments for the conventional farm tractors.

One object of this invention is to simplify and improve tree pulling attachments which may be applied to conventional farm tractors to effect the removal of trees, brush, posts, and the like from the ground easily and quickly.

Another object of the invention is to provide an attachment for a conventional farm tractor, which may be applied to, or removed from, the tractor quickly and readily by available farm labor and which will be effective for pulling up and removing trees, brush, posts, etc., by the power action of the tractor.

Still another object of the invention is to provide a sturdy and rigid construction which, nevertheless, is simple and inexpensive to build and which may be applied to a tractor for use by the power thereof to effect removal of objects from the ground by pulling up and separating such objects.

These objects may be accomplished by providing a mounting capable of application to a conventional farm or row type tractor and which may be applied to, or removed from, such tractor quickly and readily with available farm labor. Mounted on the supporting structure are a pair of jaw members operatively connected with a power device, such as a hydraulic cylinder, for applying opening and closing movements to the jaw members in effecting gripping or disengaging action with respect to a tree, brush, or post, or the like. The mounting for the jaw members is operatively connected with power lift means on the tractor, so as to be raised or lowered bodily, and thereby to effect lengthwise displacement of the supported object.

This embodiment is illustrated in the accompanying drawings, in which:

FIG. 1 is a perspective view of a portion of a tractor, having the improved attachment applied thereto;

FIG. 2 is a top plan view thereof;

FIG. 3 is a horizontal section on the line 3—3 in FIG. 2;

FIG. 4 is a detail sectional view through one of the cylinder mountings; and

FIG. 5 is a similar view at right angles thereto.

The invention is shown as applied to a conventional form of tractor, generally indicated by the numeral 1 and which preferably is in the form of a wheeled tractor of the farm type, either tricycle or four wheel type. Such a tractor is self-propelled and power driven for operation of the usual farming implements attached thereto.

At the rear end of the tractor, on opposite sides thereof, are implement mounting sockets, generally indicated at 2 and supported on arms 3 pivotally mounted at 4 on the frame structure of the tractor in suitable positions with respect thereto, so as to permit vertical swinging movement of the sockets 2. These sockets 2 are raised and lowered by links, generally indicated at 5, which extend from the respective sockets, with which they are connected, to the outer ends of lever members 6 mounted on a cross shaft 7. The cross shaft 7 is adapted to be turned by hydraulic pressure, being operatively connected with a piston in a hydraulic cylinder 8 in the tractor. The control for the hydraulic cylinder is not illustrated, but any suitable and desired control can be used for the purpose. Upon operation of the hydraulic cylinder, the shaft 7 is turned to raise or lower the links 5 and thereby the sockets 2.

The attachment includes a suitable mounting structure that may be applied to and removed from the sockets 2. In the form of the invention illustrated, lifting arms 9 engage at one end thereof in the sockets 2 and may be secured in any suitable manner to the sockets, either yieldably or rigidly, for supporting the lifting arms and for raising and lowering movements of the arms by the movement of the sockets in the manner described above. The lifting arms 9 project outwardly from the sockets a distance to support the operating parts of the attachment therebetween.

A mounting plate or table is shown at 10 extending in bridging relation between the lifting arms 9 and supported thereon. In the form of the invention illustrated, the plate or table 10 is mounted upon angle bar members 11 secured by welding or any other suitable manner to the inner faces of the lifting arms 9. Bolts or other fastenings 12 extend through the plate 10 at opposite edges thereof and through the inturned flanges on the angle bar members 11, forming secure and detachable fastenings for holding the plate in place between the lifting arms 9.

The plate 10 forms a platform upon which a pair of jaw members 13 are operatively mounted. These jaw members extend rearwardly from the free edge of the plate 10 a sufficient distance for grasping the object to be pulled from the ground and may be of any desired length. Suitable means may be provided on the jaw 13 for gripping the object. In the illustrated embodiment, the gripping means is shown as serrations or teeth, indicated generally at 14, and provided directly on the jaw members at the inner edges thereof and spaced along the length thereof.

Each of the jaw members is seated directly upon the upper face of the plate 10 and extends over said face through a substantial distance, to effect secure support therefor, during the pulling action. The jaw members are pivotally mounted at 15 on the supporting plate 10, so as to swing toward and from each other. The pivots 15 are provided by bolts extending through the supporting plate and through the inner ends of the jaw members 13. The bolts or pivots 15 are connected together by a link 16, to strengthen the connection and mounting for the jaw members and to prevent the possibility of spreading thereof.

Operatively connected with the jaw members 13 are angle portions 17 extending outwardly from the pivots 15. These members 17 are shown as formed of one integral piece with the jaw members, in the manner of a bellcrank, although they may be made separate therefrom and rigidly secured to the jaw members, if desired.

At the outer ends of the angle portions 17 and fixed rigidly thereto are ears 18 that extend somewhat inwardly, substantially parallel with the jaw members 13. The ears 18 are connected together with an operative device, shown in the form of a hydraulic cylinder 19. The head of the cylinder is connected with one of the ears 18, and the piston rod thereof is connected with the other ear 18, so as to effect a movement axially of the cylinder toward or from each other. Thus, upon operation of the cylinder 19, the jaw members 13 can be moved toward or from each other for gripping or disengagement of the supported object. The gripping action that can be applied in this way is dependent solely upon the power of the cylinder 19.

The cylinder 19 may be either of a single acting or a double acting type and should be provided with suitable control means for the supply of hydraulic pressure thereto. In the example illustrated, the hydraulic control system is illustrated at 20, provided with a suitable control valve 21 for regulating the supply of hydraulic fluid to the cylinder under control of the operator. Any suitable means may be used for the purpose, however, as found desirable for the structure employed.

The supporting plate 10 may be strengthened further, if needed, by providing reinforcing bars 22 and 23 above and below the free edge thereof and extending in bridging relation relative to said free edge and along the same. Spacer members 24 separate the intermediate portion of the bar 22 from the adjacent face of the plate 10. The members 24 are spaced apart a sufficient distance for freedom of operation of the jaw members 13 therebetween. A spacer member is shown at 25 between the intermediate portion of the reinforcing bar 23 and the free edge of the supporting plate 10. These parts may be welded or otherwise secured together and to the supporting blade 10.

The parts of the structure should be made sufficiently sturdy to withstand the usage to which they may be subjected. Few parts are involved, however, and the simplicity of the structure enables it to be manufactured at relatively low cost and to be assembled and operated by conventional farm labor, without requiring special skills for maintenance and operation.

The attachment can be applied to or removed readily from the conventional tractor. The lifting arms 9 are detachably engaged in the sockets 2, where they are retained either by friction or by yieldable or detachable fastenings, but the detachable engagement of the lifting arms in the sockets enables the attachment to be applied readily and easily to the tractor and, when in use, it effects a secure and effective operation thereof.

In the operation of the equipment, the tractor is moved up to the object to be withdrawn from the ground, with the jaw members 13 spread apart substantially as illustrated in FIGS. 1 and 2. The jaw members may be lowered to the required height above the ground by the action of the hydraulic cylinder 8. Then, when the vehicle has moved the jaw members into embracing relation with the object, the hydraulic cylinder 19 is operated by appling hydraulic pressure in spreading relation between the ears 18, thereby acting to swing the jaw members 13 on the pivots 15, so that the jaw members move toward each other and thereby apply an inward gripping engagement with the object to be withdrawn, effective to hold the object securely between the jaw members. Thus, a small tree, brush or post, or the like, may be gripped between the jaw members for withdrawing the same from the ground.

Thereafter, the hydraulic cylinder 8 is operated to raise the lever member 6 and pull upward on the links 5 and thus swing the sockets 2 upwardly on their pivotal mountings 4. This causes a power raising movement to be imparted to the lifting arms 9 and the supporting plate 10, which, in turn, lifts the gripping jaws 13 to effect an upward pull on the supported object held by the jaw.

This action imparts an effective pulling out of the ground of the object gripped between the jaws 13. It has been used for pulling small trees, brush and posts, and is extremely effective for the purpose, removing completely not only the trees and brush, but also the roots from the ground. It may be used as well for forcing posts into the ground merely by reversing the action described and causing the post to be gripped and forced downward to an effective extent.

The cylinder 19 may be made detachable, if desired. This may be accomplished by providing a yoke 26 on each of the closed ends of the cylinder 19 and on the outer end of the piston rod thereof. This yoke 26 is connected by a pivot pin 27 with the adjacent ear 18 on the jaw 13. The pin 27 is slidable through opposite sides of the yoke 26 and may be removable therefrom.

As shown in FIGS. 4 and 5, the pin 27 may be locked in place by providing a groove 28 therein. If such a groove be provided in each end portion of the pin 27, the pin may be turned end for end with respect to the yoke. A locking pin 29 is slidable transversely of the yoke 26 at right angles to the pivot pin 27, in tangential alignment with the groove 28. The locking pin 29 has a reduced or grooved portion 30 in position to align with the pivot pin 27, when the locking pin 29 is pressed inward against the tension of a spring 31. Then the pivot pin can be withdrawn. When, however, the parts are in the positions shown in FIG. 5, the locking pin holds the pivot pin against removal.

The attachment is shown as applied to the rear end portion of a conventional farm tractor, but may be applicable to either end thereof, where the hydraulic raising and lowering mechanism may be provided. The invention utilizes the hydraulic mechanism of the tractor in cooperation with the grapping means provided by the attachment for effecting the ready removal of the objects from the ground or the insertion of posts into the ground, as found desirable.

While the invention has been illustrated and described in one embodiment, it is recognized that variations and changes may be made therein without departing from the invention as set forth in the claims.

I claim:

1. In a tractor having a pair of mounting sockets at opposite sides thereof pivotally mounted for raising and lowering movements with respect to the tractor, lever members mounted on the tractor and having link connection with the sockets, and hydraulic power means operatively connected with the lever members for effecting raising and lowering movements of the sockets, the combination therewith, of an attachment comprising a pair of lifting arms having detachable engagement with the sockets and supported thereby and with said arms projecting outwardly from the sockets, a supporting plate extending in bridging relation between the arms and secured thereto, a pair of jaw members pivotally mounted on the supporting plate and extending outwardly from the plate in position for receiving and clamping a supported object therebetween, a power cylinder extending in bridging relation between the jaw members and acting in opposed relation thereon for effecting gripping engagement between the jaw members and the object for holding the object during raising movement of the supporting plate by the first-mentioned power means to effect removal thereof from the ground.

2. In a tractor having implement supporting means mounted for raising and lowering movements and power means operatively connected with the supporting means for effecting raising and lowering movements thereof, the combination therewith of an attachment comprising a pair of lifting arms mounted on the supporting means and projecting outwardly therefrom, a supporting table extending in bridging relation between the arms and secured thereto, a pair of jaw members pivotally mounted on the supporting table in close proximity to the implement supporting means and intermediate the arms and extending outwardly from the table in position for receiving and clamping a supported object therebetween, and power means operatively connected with the jaw members for effecting said gripping engagement thereby.

3. In a tractor having a pair of mounting sockets mounted thereon for raising and lowering movements relative thereto, and power means operatively connected with the sockets for effecting said raising and lowering movements, the combination therewith, of a pair of lifting arms detachably mounted in the sockets and projecting outwardly therefrom, a supporting table extending in bridging relation between the arms and secured thereto, a pair of jaw members pivotally mounted on the supporting table and extending outwardly therefrom in position for receiving and clamping a supported object therebetween, and power means operatively connected with the jaws for effecting said gripping engagement thereby.

References Cited in the file of this patent

UNITED STATES PATENTS

| | | |
|---|---|---|
| 2,505,923 | Taylor et al. | May 2, 1950 |
| 2,554,433 | Warren | May 22, 1951 |
| 2,663,952 | Winget | Dec. 29, 1953 |
| 2,814,396 | Neale | Nov. 26, 1957 |